United States Patent
Aoun et al.

(10) Patent No.: US 12,366,331 B2
(45) Date of Patent: Jul. 22, 2025

(54) GAS SUPPLY SYSTEM FOR HIGH- AND LOW-PRESSURE GAS CONSUMING APPLIANCES

(71) Applicant: GAZTRANSPORT ET TECHNIGAZ, Saint Remy les Chevreuse (FR)

(72) Inventors: Bernard Aoun, Saint Remy les Chevreuse (FR); Romain Narme, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 301 days.

(21) Appl. No.: 18/247,302

(22) PCT Filed: Sep. 28, 2021

(86) PCT No.: PCT/FR2021/051677
§ 371 (c)(1),
(2) Date: Mar. 30, 2023

(87) PCT Pub. No.: WO2022/069833
PCT Pub. Date: Apr. 7, 2022

(65) Prior Publication Data
US 2023/0408035 A1   Dec. 21, 2023

(30) Foreign Application Priority Data

Oct. 2, 2020 (FR) ........................ 2010112
Jun. 30, 2021 (FR) ........................ 2107081

(51) Int. Cl.
*F17C 9/00* (2006.01)
*F17C 9/04* (2006.01)

(52) U.S. Cl.
CPC .......... *F17C 9/04* (2013.01); *F17C 2221/033* (2013.01); *F17C 2223/0153* (2013.01);
(Continued)

(58) Field of Classification Search
CPC .. F17C 9/02; F17C 2265/03; F17C 2265/031; F17C 2265/032
See application file for complete search history.

(56) References Cited

U.S. PATENT DOCUMENTS

| 2016/0215930 A1* | 7/2016 | Nelson ................ B63B 25/16 |
| 2018/0022432 A1 | 1/2018 | Lee et al. |
| 2020/0239109 A1* | 7/2020 | Lee .................... F25J 1/0025 |

FOREIGN PATENT DOCUMENTS

| EP | 3 252 297 A1 | 12/2017 |
| KR | 10-2014-0138018 A | 12/2014 |

(Continued)

OTHER PUBLICATIONS

International Search Report mailed on Feb. 14, 2022 in PCT/FR2021/051677 filed on Sep. 28, 2021 (2 pages).

*Primary Examiner* — Brian M King
(74) *Attorney, Agent, or Firm* — Oblon, McClelland, Maier & Neustadt, L.L.P.

(57) ABSTRACT

A gas supply system for a high-pressure gas consuming appliance and a low-pressure gas consuming appliance of a floating structure including a tank containing the gas is disclosed. The supply system includes: a first supply circuit and a second supply circuit; a gas return line; and a first heat exchanger and a second heat exchanger configured to carry out a heat exchange between the gas of the first supply circuit and the gas circulating in the return line. The first supply circuit includes an additional pump.

17 Claims, 6 Drawing Sheets

(52) U.S. Cl.
CPC .. *F17C 2225/033* (2013.01); *F17C 2225/035* (2013.01); *F17C 2227/0302* (2013.01); *F17C 2270/0105* (2013.01)

(56) References Cited

FOREIGN PATENT DOCUMENTS

KR       20140138018 A  *  12/2014
WO    WO 2017/162977 A1    9/2017

* cited by examiner

FIG. 6

GAS SUPPLY SYSTEM FOR HIGH- AND LOW-PRESSURE GAS CONSUMING APPLIANCES

The present invention relates to the field of liquid-state gas storage and/or transport ships and relates more particularly to a gas supply system for consuming apparatuses included in such ships.

During a journey made by a ship comprising a tank of gas in the liquid state intended to be consumed and/or delivered to a destination point, said ship may be able to use at least a part of said gas in the liquid state in order to supply at least one of its engines, via a gas supply system. This is the case with ships provided with a ME-GI type propulsion engine. In order to supply this type of engine, the gas must be compressed to very high-pressure by special compressors capable of compressing the gas up to 300 bar, but such compressors are expensive, giving rise to substantial maintenance costs and inducing vibrations in the ship.

An alternative to the installation of these high-pressure compressors is to vaporize the gas in liquid form at 300 bar before the gas is sent to the propulsion engine. Such a solution does not make it possible to eliminate the gas in vapor form (or BOG, which stands for "Boil-Off Gas") naturally forming within a tank at least partially containing the cargo. Low-pressure compressors can be installed in order to supply an auxiliary engine capable of consuming the gas in the form of a low-pressure vapor. On the other hand, in such a configuration, if the gas in vapor form is present in too great a quantity, or more generally in a quantity greater than a need for consumption of the auxiliary engine, the gas in vapor form not consumed by the auxiliary engine is then accumulated in the form of pressure in the tank within a certain limit, then eliminated by combustion, or as a last resort by releasing it into the atmosphere. Elimination of this kind causes a waste of fuel, as well as detrimental consequences for the environment.

The present invention makes it possible to eliminate such a loss by proposing a gas supply system for at least one high-pressure gas consuming apparatus and at least one low-pressure gas consuming apparatus of a floating structure comprising at least one tank configured to contain the gas, the supply system comprising:

- at least a first gas supply circuit of the high-pressure gas consuming apparatus, comprising at least one pump configured to pump the gas collected in the liquid state into the tank,
- at least one high-pressure evaporator configured to evaporate the gas circulating in the first gas supply circuit,
- at least one second circuit supplying gas to the low-pressure gas-consuming apparatus, comprising at least one compressor configured to compress gas taken in the vapor state into the tank to a pressure compatible with the requirements of the low-pressure gas-consuming apparatus, characterized in that the supply system comprises a gas return line connected to the second supply circuit downstream of the compressor and extending to the tank, the supply system comprising at least a first heat exchanger and at least a second heat exchanger each configured to perform a heat exchange between the gas circulating in the vapor state return line and the gas in liquid state circulating in the first supply circuit, the first supply circuit comprising an additional pump interposed between the first heat exchanger and the second heat exchanger.

By virtue of such a supply system, the gas in the vapor state present in the tank and not used for the consumption of the low-pressure gas consuming apparatus can be condensed and is thus returned to the tank in the liquid state, instead of being eliminated. The loss of the excess gas in the vapor state present in the tank is then at least reduced.

The first gas supply circuit makes it possible to meet the fuel needs of the high-pressure gas-consuming apparatus. Said apparatus may for example be the means for propelling the floating structure, for example an ME-GI engine. The first supply circuit extends from the tank to the high-pressure gas-consuming apparatus. The pump is installed at the bottom of the tank and ensures the pumping of the gas in the liquid state so that it can circulate in the first supply circuit.

As the gas must be in the vapor state to be able to supply the high-pressure gas-consuming apparatus, the high-pressure evaporator guarantees the evaporation of the gas before it is supplied to the high-pressure gas consuming apparatus. The high-pressure evaporator is the site of the heat exchange between the liquid-state gas circulating in the first supply circuit and a heat-transfer fluid, for example glycol water, seawater or water vapor. This heat transfer fluid must be at a sufficiently high temperature to create a change of state of the gas so that it goes into the vapor or supercritical state to be able to supply the high-pressure gas consuming apparatus.

Before the liquid in the liquid state circulating in the first supply circuit is vaporized by means of the high-pressure evaporator, the gas in the liquid state passes through the first heat exchanger, then the second heat exchanger. For this, the first heat exchanger and the second heat exchanger are connected to one another by a portion of the first supply circuit so that the gas in the liquid state can pass successively through the two heat exchangers. The temperature of said gas in the liquid state thus tends to increase before its passage through the high-pressure evaporator. Thus, the gas circulating in the first supply circuit can be in a two-phase state at the outlet of the second heat exchanger.

Generally, the gas contained in the tank can change naturally, or be forced by the floating structure, into the vapor state. The gas within the tank changing to the vapor state must be discharged in order to avoid creating overpressure within the tank.

Such a function is provided by the second gas supply circuit of the low-pressure gas-consuming apparatus. Such a second supply circuit extends from the tank to the low-pressure gas-consuming apparatus. Said apparatus can for example be an auxiliary motor such as an electric generator. The compressor arranged on the second supply circuit is responsible for drawing the gas present in the tank space in order to be able both to supply the low-pressure gas consuming apparatus but also to regulate the pressure in the tank.

At the outlet of the compressor, the gas in the vapor state can supply the low-pressure gas consuming apparatus or circulate through the return line if the low-pressure gas consuming apparatus does not require fuel intake. Since the return line is connected downstream of the compressor, the gas in the vapor state drawn by the compressor can therefore circulate therein.

The gas in the vapor state circulating in the return line passes firstly through the second heat exchanger, then the first heat exchanger, before returning to the tank. Thanks to the exchange of calories occurring between the gas in the liquid state circulating in the first supply circuit and the gas in the vapor state circulating in the return line, the temperature of the gas in the vapor state decreases by passing through the two heat exchangers until said gas condenses and returns to the liquid state substantially when leaving the first heat exchanger. The recondensed gas then circulates to the tank.

According to one example, the first heat exchanger and the second heat exchanger are upstream of the high-pressure evaporator along the first supply circuit. This ensures that the gas is in the liquid state in the part of the first supply circuit that is located within the first heat exchanger and within the second heat exchanger.

According to one feature of the invention, the first heat exchanger, the second heat exchanger and the high-pressure evaporator are physically separate heat exchangers.

The additional pump makes it possible to increase the pressure of the gas in the liquid state circulating in the first supply circuit, so that it has a compatible pressure to supply the high-pressure gas consuming apparatus.

The positioning of the additional pump between the two heat exchangers is particularly advantageous. Indeed, placing the additional pump upstream of the first heat exchanger causes an increase in the pressure and temperature of the gas in the liquid state as soon as it passes through the first heat exchanger, which is detrimental to the condensation of the gas in the vapor state circulating in the return line and passing through the first heat exchanger. Furthermore, since the gas circulating in the first supply circuit may be in a two-phase state at the outlet of the second heat exchanger, arranging the additional pump downstream of the second heat exchanger may adversely affect the correct operation of the latter given that the additional pump only allows pumping a fluid in the liquid state. The optimal arrangement consists therefore in placing the pump between the two heat exchangers.

According to one feature of the invention, the return line can comprise a divergence point dividing the return line into a first section and a second section both extending from the point of divergence to the tank, the first heat exchanger being configured to exchange heat between the gas circulating in the vapor state in the first section of the return line and the gas in the liquid state circulating in the first supply circuit, while the second section bypasses the first heat exchanger. The division of the return line into two distinct sections corresponds to a second embodiment of the supply system according to the invention, a first embodiment corresponding to a supply system as described above, that is, with a return line not having a divergence point or division into two sections.

According to this second embodiment, the gas in the vapor state present in the tank and not used for the consumption of the low-pressure gas consuming apparatus can be condensed by circulating via the first section of the return line and is thus returned to the tank in the liquid state, instead of being eliminated.

In addition, when the flow rate of gas in the liquid state circulating in the first supply circuit is not sufficient to condense all the gas in the vapor state circulating in the return line, the excess fraction of the gas can be directed toward the second section of the return line in order to return directly to the tank. Such a situation can occur when the floating structure equipped with the supply system according to the invention does not require a large quantity of gas in the liquid state for propulsion, for example when the floating structure moves at a reduced speed. With the exception of the specificity of the aforementioned return line, the first embodiment and the second embodiment have identical features.

It has been determined by the inventors that complete condensation of the gas in the vapor state circulating in the return line was possible only when the quantity of gas in the liquid state circulating in the first supply circuit is greater than or equal to six times the quantity of gas in the vapor state circulating in the return line. Such an example is applicable when the compressor compresses the gas in the vapor state to about 10 bar, but the ratio may change depending on the pressure delivered by the compressor. If this condition is satisfied, the gas in the vapor state then circulates in the first section of the return line in order to be condensed. If the quantity of gas in the liquid state circulating in the first supply circuit is less than six times the quantity of gas in the vapor state circulating in the return line, then it is advantageous to circulate the gas in the vapor state at least partially in the second section of the return line, a portion of the gas in the vapor state then circulating in the first section in an amount such that the condensation is complete.

The gas in the vapor state circulating in the return line can circulate in the first section or in the second section from the divergence point. The gas in the vapor state circulating in the return line passes firstly through the second heat exchanger, then the first heat exchanger, before returning to the tank. According to this configuration, thanks to the exchange of calories occurring between the gas in the liquid state circulating in the first supply circuit and the gas in the vapor state circulating in the return line, the temperature of the gas in the vapor state decreases by passing through the two heat exchangers until said gas condenses and returns to the liquid state substantially at the outlet of the first heat exchanger. The condensed gas then circulates to the tank. If the gas in the vapor state circulates in the second section, it passes through the second exchanger, then returns directly into the tank. According to this configuration, the temperature of the gas in the vapor state decreases due to the exchange of calories carried out in the second heat exchanger, however it is not condensed. The gas thus returns to the tank in the vapor state, but nevertheless being cooled.

According to one feature of the invention, the divergence point can be arranged on the return line between the first heat exchanger and the second heat exchanger. In other words, the gas in the vapor state circulates in the first section or the second section after having passed through the second heat exchanger. More particularly, it is a main section of the return line that passes through the second heat exchanger, said main section corresponding to the section of the return line upstream of the divergence point relative to a direction of circulation of the gas in the vapor state. Such a feature relates to the second embodiment of the supply system as mentioned above.

According to one feature of the invention, the divergence point can be arranged on the return line between the connection to the second supply circuit and the second heat exchanger, the first section and the second section passing through the second heat exchanger. This is a third embodiment of the supply system according to the invention. According to this third embodiment, the divergence point is arranged upstream of the second heat exchanger. The second heat exchanger being configured to perform heat exchange in particular with the gas in the vapor state of the return line, each section of the first section and the second section passes through the second heat exchanger. The second heat exchanger thus comprises at least three passes, that is, two passes for each of the sections of the return line in addition to the pass in which the gas in the liquid state circulates from the first supply circuit.

According to one feature of the invention, the second section of the return line comprises one end submerged in the liquid contained in the tank, the second section comprising an ejection member arranged at the submerged end. The ejection member makes it possible in particular to expand the gas in the vapor state circulating in the second section of the return line before the gas is dispersed into the tank. The expansion of the gas in the vapor state, associated with the fact that the submerged end is preferentially arranged at the bottom of the tank, makes it possible to liquefy at least part of the gas in the vapor state when it returns to the tank, also leading to an increase in temperature of the gas in liquid form present in the tank. The ejection member may for example be an ejector or a bubbling device.

According to one feature of the invention, the second section of the return line comprises a flow rate regulating member. The flow rate regulating member can for example be a valve arranged downstream of the second heat exchanger in the case where the latter is itself arranged downstream from the divergence point. The flow rate regulating member can also act as an expansion valve. In the case where the second section of the return line is provided with an ejection member as described above, the flow rate regulating member is chosen so as to limit the expansion of the gas in the vapor state.

According to one feature of the invention, the first heat exchanger is configured to condense the gas circulating in the return line. The first heat exchanger is the exchanger through which the gas in the liquid state of the first supply circuit passes when said gas in the liquid state is at its lowest temperature. It is therefore the exchange of heat taking place in the first heat exchanger that will change the state of the gas circulating in the return line to change it from the vapor state to the liquid state. In the case where the return line is divided into two sections, for example according to the second embodiment or the third embodiment, only the gas circulating in the first section of the return line is condensed, since the gas circulating in the second section of the return line bypasses the first heat exchanger.

According to one feature of the invention, the second heat exchanger is configured to pre-cool the gas circulating in the return line. At the outlet of the first heat exchanger, the liquid gas circulating in the first supply circuit is less cold than at the inlet of the first heat exchanger, a heat exchange having been used to condense the gas in the vapor state of the return line. Subsequently, the gas in the liquid state is compressed by the additional pump and then passes through the second heat exchanger. It also involves an exchange of heat in the second heat exchanger, allowing the pre-cooling of the gas in the vapor state in the return line. Even if the flow rate of gas in the liquid state circulating in the first supply circuit is insufficient to perform a total condensation of the gas in the vapor state circulating in the return line, cooling is however carried out in the second heat exchanger.

According to one feature of the invention, the return line comprises an expansion member arranged downstream of the first heat exchanger. The expansion member makes it possible to lower the pressure of the gas circulating in the return line once the gas is condensed when it passes through the first heat exchanger. By virtue of the expansion member, the gas in the liquid state is returned to the tank at a temperature close to the temperature of the liquid-vapor equilibrium of LNG. The role of the expansion member is also to regulate the flow rate of gas to be condensed circulating in the return line. In the case where the return line is divided into two sections, the expansion member is positioned at the first section of the return line, always downstream of the first heat exchanger.

According to one feature of the invention, the supply system comprises an auxiliary supply line connected to the first supply circuit, upstream of the first heat exchanger, and extending to the second supply circuit, downstream of the compressor, the supply system comprising a low-pressure evaporator configured to evaporate the gas circulating in the auxiliary supply line. Such an auxiliary supply line is used when the low-pressure gas consuming apparatus requires being supplied with gas in the vapor state, but there is an insufficient quantity in the tank space. The auxiliary supply line thus makes it possible to derive a part of the gas in the liquid state circulating in the first supply circuit. This part is then evaporated by the low-pressure evaporator, according to an operation similar to that of the high-pressure evaporator, that is to say, by heat exchange with a heat-transfer fluid such as glycol water, seawater or water vapor, for example. The low-pressure evaporator thus induces an exchange of heat between the gas in the liquid state circulating in the auxiliary supply line and this heat-transfer fluid.

Once changed to the vapor state, the gas circulates in the auxiliary supply line, then joins the second supply circuit in order to supply the low-pressure gas consuming apparatus.

If gas in the vapor state is present in sufficient quantity in the tank space, then the auxiliary supply line is not used and can for example be closed by a valve.

According to one feature of the invention, the pump is configured to raise a pressure of the gas in the liquid state to a value of between 6 and 17 bar and the additional pump is configured to raise the pressure of the gas in the liquid state to a value of between 30 and 400 bar. Such pressure ranges make it possible to raise the liquid in the liquid state to a pressure compatible with each of the gas consuming apparatuses.

The additional pump makes it possible to raise the pressure of the gas in the liquid state to a value of between 30 and 400 bar, in particular for use with ammonia or hydrogen, between 30 and 70 bar for use with liquefied petroleum gas, and preferably between 150 and 400 bar for use with ethane, ethylene or else liquefied natural gas consisting mainly of methane.

Thus, the pump arranged in the tank raises the pressure of the gas in the liquid state to a pressure allowing the supply of the low-pressure gas consuming apparatus if the auxiliary supply line is open.

It is the pump that makes it possible to increase the pressure of the gas in the liquid state circulating in the first high-pressure supply circuit, so that it is brought to a pressure compatible with supplying the high-pressure gas consuming apparatus.

According to one feature of the invention, the compressor is configured to raise a pressure of the gas to a value of between 6 and 20 bar absolute. This pressure value ensures compatibility of the gas in the vapor state present in the tank space and sucked into the second supply circuit with the low-pressure gas consuming apparatus.

According to one feature of the invention, the high-pressure evaporator is arranged downstream of the second heat exchanger on the first gas supply circuit of the high-pressure gas consuming apparatus.

According to one feature of the invention, the second heat exchanger and the high-pressure evaporator form a single heat exchanger. The first heat exchanger is then distinct and arranged upstream of a single heat exchanger which combines the second heat exchanger and the high-pressure evaporator.

Such a configuration may be advantageous, for example, in order to reduce the mechanical bulk of the supply system.

The single exchanger formed then comprises a first pass through which the gas in the liquid state circulates from the first supply circuit, a second pass through which the gas in the vapor state circulates from the return line and a third pass through which the heat transfer fluid circulates from the high-pressure evaporator. The placement of such a single heat exchanger is compatible with all the embodiments described above.

According to one feature of the invention, a ratio of gas condensed by the heat exchangers and circulating in the return line relative to an amount of gas in the liquid state circulating in the first gas supply circuit is 16%+/−5%. The first supply circuit is configured such that a gas flow rate circulating in said circuit is about six tons per hour. For six tons per hour of gas in the liquid state circulating through the heat exchangers, about one ton per hour of gas in the vapor state is circulating in the return line that is condensed.

The invention also covers a floating structure for storing and/or transporting gas in the liquid state, comprising at least one tank of gas in the liquid state, at least one-high-pressure gas consuming apparatus, at least one low-pressure gas consuming apparatus and at least one system for supplying gas to these apparatuses.

The invention also covers a system for loading or unloading a liquid gas which combines at least one land and/or port facility and at least one floating structure for storing and/or transporting liquid gas.

Finally, the invention covers a method for loading or unloading a liquid gas from a floating structure for storing and/or transporting gas in which pipes for loading and/or unloading liquid-state gas arranged on an upper deck of the floating structure can be connected, by means of appropriate connectors, to a maritime or port terminal in order to transfer the gas in the liquid state from or to the tank.

To resolve the technical problem, a gas supply system can also be provided for at least one high-pressure gas consuming apparatus and at least one low-pressure gas consuming apparatus of a floating structure comprising at least one tank configured to contain the gas, the supply system comprising:

at least a first gas supply circuit of the high-pressure gas consuming apparatus, comprising at least one pump configured to pump the gas collected in the liquid state into the tank, at least one high-pressure evaporator configured to evaporate the gas circulating in the first gas supply circuit, at least one second circuit supplying gas to the low-pressure gas-consuming apparatus, comprising at least one compressor configured to compress gas taken in the vapor state into the tank to a pressure compatible with the requirements of the low-pressure gas-consuming apparatus, characterized in that the supply system comprises a gas return line connected to the second supply circuit downstream of the compressor and extending to the tank, the supply system comprising at least one single heat exchanger which combines the high-pressure evaporator with a first heat exchanger and with a second heat exchanger each configured to exchange heat between the gas circulating in the vapor state return line and the gas in the liquid state circulating in the first supply circuit. The single heat exchanger is thus one and the same component and makes it possible to have a compact installation.

According to one aspect of this solution, the single heat exchanger comprises at least three passes, a first pass in which it is traversed by the gas taken in the liquid state in the tank and circulating in the first supply circuit, a second pass of the gas circulating in the return line and a third pass of the heat transfer fluid, responsible for heating the gas removed in the liquid state in the tank.

According to one aspect of this solution, the first pass is separated into three separate portions, in particular a first portion intended for heat exchange with the second pass, a second portion intended for heat exchange with the second pass and a third portion intended for heat exchange with the third pass.

According to one aspect of the invention, the first portion of the first pass is separated from the second portion of this first pass by the compressor.

Other features and advantages of the invention will appear both from the description which follows and from several exemplary embodiments, which are given for illustrative purposes and without limitation with reference to the appended schematic drawings, in which.

The terms "upstream" and "downstream" employed in the following description are used to express positions of elements within gas circuits in the liquid state or in the vapor state and refer to the direction of circulation of said gas within said circuit.

FIGS. 1 to 5 represent a gas supply system 1 arranged on a floating structure. The supply system 1 makes it possible to circulate gas that can be in the liquid state, in the vapor state, in the two-phase state or in the supercritical state, from a storage and/or transport tank 8, to a high-pressure gas consuming apparatus 4 and/or to a low-pressure gas consuming apparatus 5, in order to supply said appliances with fuel.

Said floating structure may for example be a ship that can store and/or transport gas in the liquid state. In this case, the supply system 1 is capable of using the gas in the liquid state that the floating structure stores and/or transports to supply the high-pressure gas-consuming apparatus 4, which may for example be a propulsion engine, and the low-pressure gas-consuming apparatus 5, which may for example be an electric generator supplying the floating structure with electricity.

In order to ensure the circulation of the gas contained in the tank 8 to the high-pressure gas-consuming apparatus 4, the supply system 1 is provided with a first gas supply circuit 2. The first supply circuit 2 comprises a pumping member 9 arranged in the tank 8. The pump 9 makes it possible to pump the gas in the liquid state and to circulate it in particular in the first supply circuit 2. By drawing the gas in the liquid state, the pump 9 raises the pressure thereof to a value of between 6 and 17 bar.

The gas in the liquid state, in a direction of circulation from the tank 8 to the high-pressure gas consuming apparatus 4, passes through a first heat exchanger 6, is pumped by an additional pump 10 and passes through a second heat exchanger 7. The details concerning the two heat exchangers 6, 7 will be described below.

After passing through the second heat exchanger 7, the gas circulates to a high-pressure evaporator 11. The high-pressure evaporator 11 makes it possible to modify the state of the gas circulating in the first supply circuit 2 in order to change it to the vapor or supercritical state. Such a state allows the gas to be compatible to supply the high-pressure gas-consuming apparatus 4. The evaporation of the gas in the liquid state can for example be carried out by heat exchange with a heat transfer fluid at a temperature high enough to evaporate the gas in the liquid state, in this case glycol water, seawater or water vapor.

Figure 1:
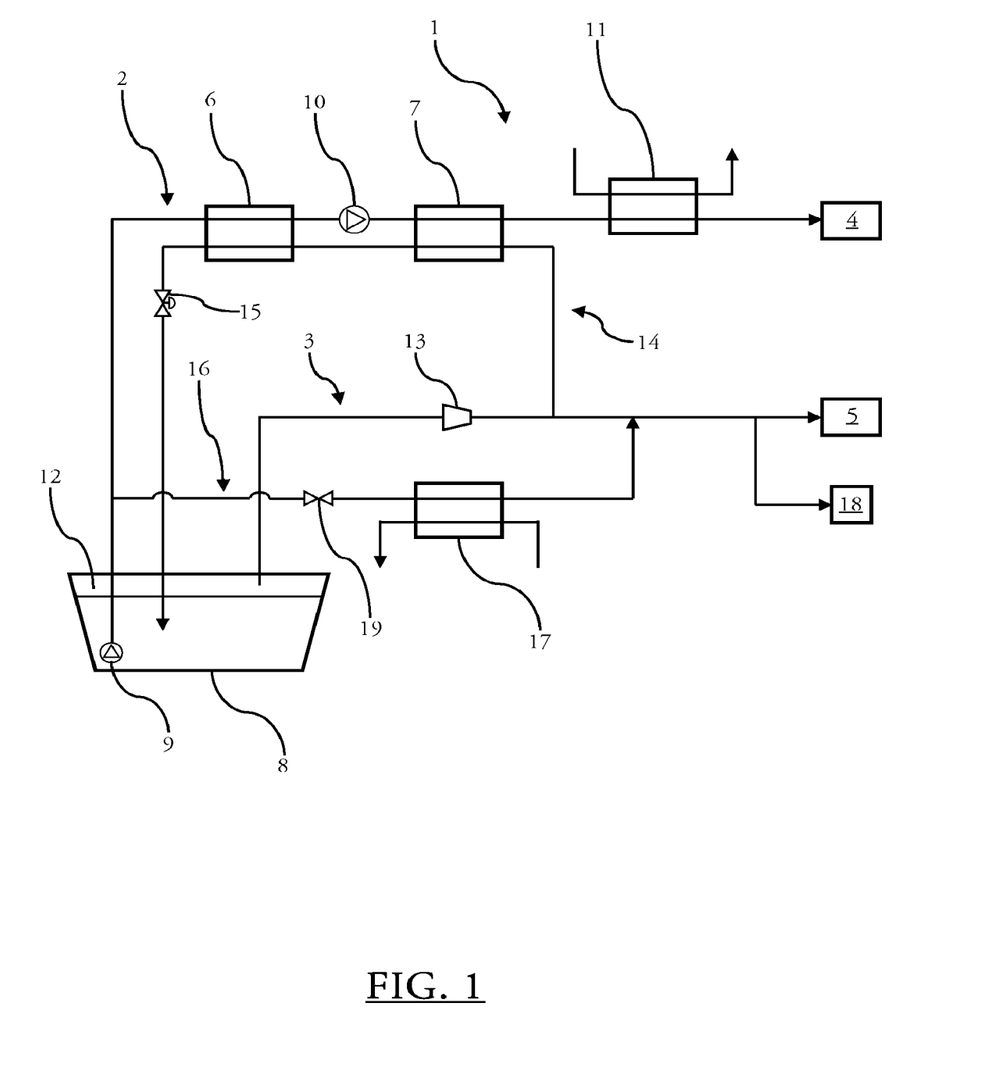
FIG. 1 is a schematic representation of a supply system according to a first embodiment of the invention.

According to a first embodiment shown in FIG. 1, the first heat exchanger 6, the second heat exchanger 7 and the high-pressure evaporator 11 are heat exchangers separated from one another. Such a configuration makes it possible to design and manufacture each of the heat exchangers in a technology suitable for the pressure of the fluids passing through them. In the case in point, the first heat exchanger 6 can be produced according to a less expensive technology than the one used for manufacturing the second heat exchanger 7, because the pressure in the first exchanger is significantly lower than the one in the second heat exchanger 7. The same applies for the high-pressure evaporator 11.

The increase in gas pressure is ensured by the additional pump 10 when it pumps the gas in the liquid state. The additional pump 10 makes it possible to raise the pressure of the gas in the liquid state to a value of between 30 and 70 bar for use with liquefied petroleum gas, and preferably between 150 and 400 bar for use with ethane, ethylene or else liquefied natural gas consisting mainly of methane.

By virtue of the combination of the additional pump 10 and the high-pressure evaporator 11, the gas is at a pressure and in a compatible state for the supply of the high-pressure consuming apparatus 4. Such a configuration makes it possible to avoid the installation of high-pressure compressors on the first supply circuit 2 which have cost constraints and generate strong vibrations.

Within the tank 8, a part of the gas cargo can naturally change to the vapor state and diffuse into a space of the tank 12. In order to avoid overpressure within the tank 8, the gas in the vapor state contained in the tank space 12 must be discharged. However, the first supply circuit 2 is configured to use the gas in the liquid state to supply the high-pressure gas consuming apparatus 4.

The supply system 1 therefore comprises a second gas supply circuit 3, which uses the gas in the vapor state to supply the low-pressure gas-consuming apparatus 5. The second supply circuit 3 extends between the tank space 12 and the low-pressure gas consuming apparatus 5. In order to suck the gas in the vapor state contained in the tank space 12, the second supply circuit 3 comprises a compressor 13. In addition to drawing the gas in the vapor state, the compressor 13 also makes it possible to raise a pressure of the gas in the vapor state circulating in the second supply circuit 3 to a pressure of between 6 and 20 bar absolute, so that the gas in the vapor state is at a compatible pressure for the supply of the low-pressure gas consuming apparatus 5. The second supply circuit 3 thus makes it possible to supply the low-pressure gas-consuming apparatus 5, while regulating the pressure within the tank 8 by sucking the gas in the vapor state present in the tank space 12.

The presence of the gas in the vapor state in excess quantity within the tank space 12 causes an overpressure within the tank 8. It is therefore necessary to evacuate the gas in the vapor state in order to lower the pressure within the tank 8. The excess vapor state can then for example be eliminated by a burner 18. However, the supply system 1 according to the invention comprises a return line 14 which extends from the second supply circuit 3 to the tank 8.

The return line 14 is connected to the second supply circuit 3 downstream of the compressor 13 relative to a direction of circulation of the gas in the vapor state circulating in the second supply circuit 3. According to the direction of circulation of the gas in the vapor state circulating in the return line 14, said gas passes through the second heat exchanger 7 in a first step, then passes through the first heat exchanger 6. The exchange of calories is carried out within the first heat exchanger 6 and the second heat exchanger 7 is therefore between the gas in the liquid state circulating in the first supply circuit 2 and the gas in the vapor state circulating in the return line 14. The objective of this exchange of calories is to condense the gas in the vapor state of the return line 14, so that the latter passes in the liquid state and returns to the tank 8 in this state, instead of being eliminated by the burner 18.

The inlet of the first heat exchanger 6 is where the gas in the liquid state of the first supply circuit 2 has the lowest temperature. Consequently, it is therefore after having passed through the first heat exchanger 6 that the gas circulating in the return line 14 is condensed. The gas from the return line 14 is therefore in the vapor state at the inlet of the first heat exchanger 6 and exits in the liquid state following the exchange of calories taking place within the first heat exchanger 6.

In order to align the pressure of the gas circulating in the return line with the pressure which prevails in the tank 8, the return line 14 can comprise an expansion member 15 which lowers the pressure of the gas to a pressure of between 1 and 3 bar absolute. Once the gas is condensed, it circulates to the tank 8. The first heat exchanger 6 therefore acts as a condenser.

The ratio of the quantity of gas in the condensed vapor state relative to the quantity of gas in the liquid state circulating in the first supply circuit 2 is about 16%+1-5%. In other words, for about six tons per hour of gas in the liquid state circulating in the first supply circuit 2, about one ton per hour of gas in the vapor state circulating in the return line is condensed.

The second heat exchanger 7 is located downstream of the first heat exchanger 6 in the direction of circulation of the gas in the first supply circuit 2, and upstream of the first heat exchanger 6 in the direction of circulation of the gas in the return line 14. The second heat exchanger 7 therefore ensures pre-cooling of the gas in the vapor state circulating in the return line 14 before the gas is condensed in the first heat exchanger 6. At the first supply circuit 2, the gas in the liquid state at the inlet of the second heat exchanger 7 has previously passed through the first heat exchanger 6 and has been pumped by the additional pump 10, which therefore increased its temperature and pressure. It is thus possible that following the exchange of calories occurring at the second heat exchanger 7, the gas circulating in the first supply circuit 2 leaves the second heat exchanger 7 in a two-phase state. The temperature of the gas circulating in the return line 14 is therefore lowered after passing through the second heat exchanger 7, implementing the pre-cooling indicated above.

The additional pump 10 is advantageously arranged between the two heat exchangers 6, 7. The presence of the additional pump 10 between the first heat exchanger 6 and the second heat exchanger 7 ensures that only gas in the liquid state circulates through the additional pump 10, and not gas in a two-phase state that is likely to damage said pump.

Furthermore, the presence of the additional pump 10 downstream of the first heat exchanger 6 ensures the increase in pressure of the gas in the liquid state, without disrupting the exchange of calories occurring in the first heat exchanger 6. The condensation of the gas in the vapor state circulating in the return line 14 is thus carried out optimally.

The supply system 1 further comprises an auxiliary supply line 16, extending from the first supply circuit 2, via a tap between the pump 9 and the first heat exchanger 6, to the second supply circuit 3, connecting thereto between the compressor 13 and the low-pressure gas consuming apparatus 5. The auxiliary supply line 16 makes it possible to power the low-pressure gas-consuming apparatus 5 in the event of insufficient flow of gas in the vapor state formed within the tank space 12.

When the gas in the vapor state is not present in sufficient quantity in the tank space 12, the liquid gas pumped by the pump 9 can then circulate in this auxiliary supply line 16 in order to supply the low-pressure gas consuming apparatus 5. To do this, the auxiliary supply line 16 passes through a low-pressure evaporator 17 so that the gas in the liquid state circulating in the auxiliary supply line 16 passes to the vapor state. The operation of the low pressure evaporator 17 can for example be identical to that of the high-pressure evaporator 11, that is, the gas is evaporated by heat exchange with a heat transfer fluid at a temperature high enough to boil off the gas in the liquid state. At the outlet of the low pressure evaporator 17, the gas in the vapor state circulates within the auxiliary supply line 16, then joins the second supply circuit 3 in order to supply the low-pressure gas-consuming apparatus 5.

It is understood from the foregoing that the auxiliary supply line 16 is used only when there is not enough gas in the vapor state in the tank space 12. Thus, the auxiliary supply line 16 comprises a valve 19 controlling the circulation of gas in the auxiliary supply line 16 when the use thereof is not necessary.

Figure 2:
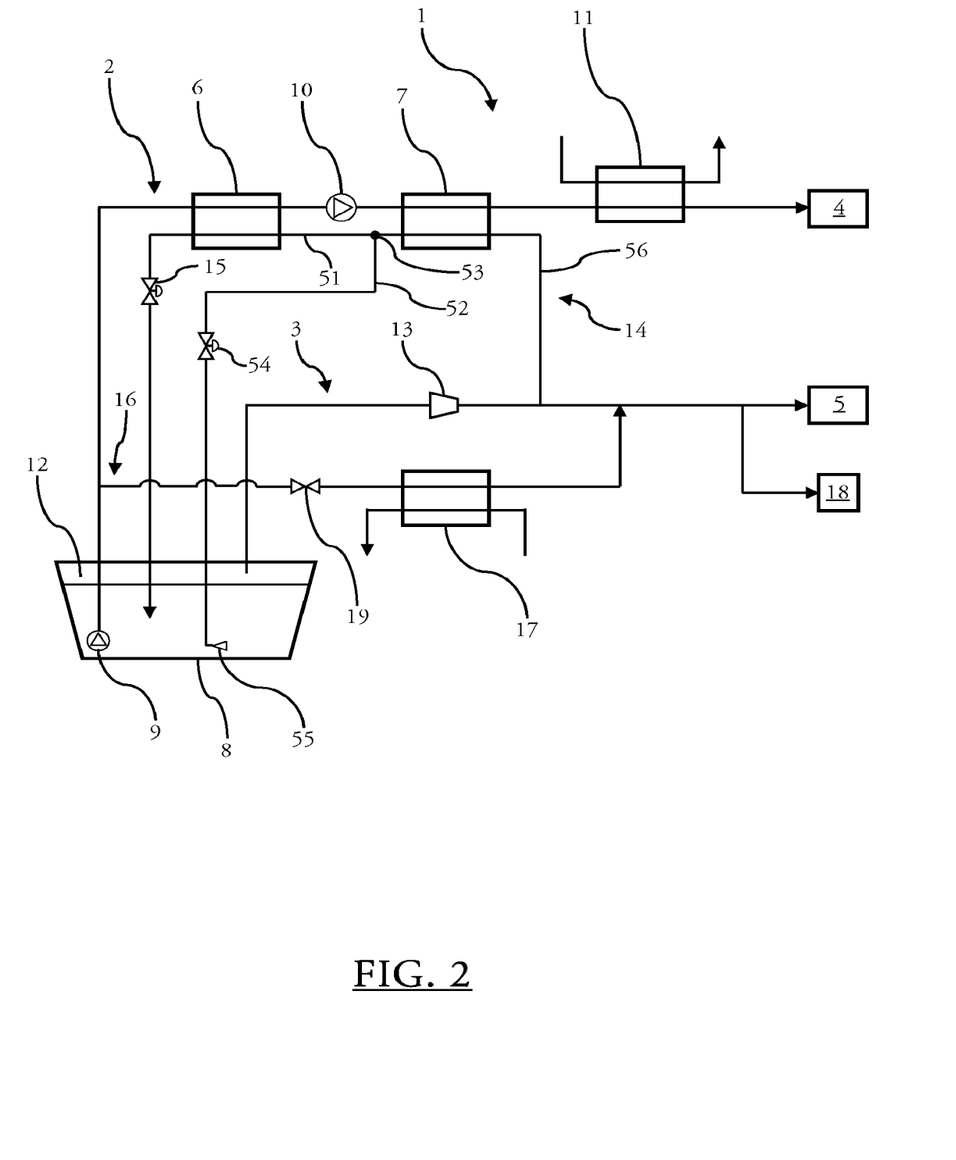
FIG. 2 is a schematic representation of a supply system according to a second embodiment of the invention.

FIG. 2 schematically represents a second embodiment of the supply system 1 according to the invention. This second embodiment differs from the first embodiment by the fact that the return line 14 comprises a main section 56 which begins at the connection with the second supply circuit 3 and which extends to a divergence point 53. At the divergence point 53, the return line 14 is divided into a first section 51 and a second section 52 both extending from the divergence point 53 to the tank 8.

According to this second embodiment, the divergence point 53 is arranged downstream of the second heat exchanger 7. It is therefore the main section 56 of the return line 14 that passes through the second heat exchanger 7.

At the outlet of the second heat exchanger 7, the gas in the vapor state circulates to the divergence point 53 and can subsequently circulate in the first section 51 or the second section 52. The first section 51 passes through the first heat exchanger 6 while the second section 52 extends to the tank 8 by bypassing the first heat exchanger 6. In other words, the gas in the vapor state can circulate in the first section 51 and be condensed by virtue of the exchange of calories occurring at the first heat exchanger 6, or it can circulate in the second section 52 and return to the tank 8 in the gaseous state.

The choice of the section in which the gas in the vapor state circulates is in particular dependent on a flow rate of gas in the liquid state circulating in the first supply circuit 2, said flow rate having to be sufficient to fully condense the gas in the vapor state circulating in the return line 14. Thus, when the quantity of gas in the liquid state circulating in the first supply circuit is greater than or equal to six times the quantity of gas in the vapor state circulating in the return line, the gas in the vapor state can be directed to the first section 51 so that condensation thereof can be implemented.

If the quantity of gas in the liquid state circulating in the first supply circuit is less than six times the quantity of gas in the vapor state circulating in the return line, then a first fraction of the gas in the vapor state circulates in the first section 51 in a quantity such that the first fraction is fully condensed in the first exchanger 6, while a second fraction of the gas in the vapor state, corresponding to the quantity of gas in the vapor state not circulating in the first section 51, circulates in the second section 52 in order to return directly to the tank 8. In the case where there is little or no circulation of gas in the liquid state circulating in the first supply circuit 2, the entirety of the gas in the vapor state then circulates in the second section 52 to return directly to the tank 8, in order to avoid a pressure drop resulting from passing through the first heat exchanger 6. In this condition, the return of the gas into the tank 8 is done in the vapor state. Such a situation occurs when the gas in the liquid state is little used to supply the high-pressure gas consuming apparatus 4.

In order to regulate the circulation in the return line 14, the expansion member 15 is arranged at the first section 51, downstream of the first heat exchanger 6, while the second section 52 comprises a flow rate regulating member 54. The expansion member 15 and the flow rate regulating member 54 can also provide a function of expanding the gas circulating in either of the sections.

Advantageously, whether for the first section 51 or the second section 52, the gas that circulates returns to the bottom of the tank 8 or at least in an area where the gas is in liquid form. More particularly, the gas circulating in the vapor state in the second section 52 returns to the bottom of the tank in the vapor state. The temperature and density of the gas in the liquid state present in the tank 8 thus makes it possible to condense the gas in the vapor state leaving the second section 52. In order to facilitate this condensation of the gas in the vapor state, the second section 52 can comprise an ejection member arranged at one end of the second section 52 submerged in the liquid content of the tank 8. The ejection member 55 makes it possible to expand the gas in the vapor state circulating in the second section 52 in order to facilitate the condensation thereof in the tank 8. The ejection member 55 may for example be an ejector or a bubbling device. The return of the gas to the vapor state in the tank 8 via the second section 52 causes an increase in the temperature of the gas in the liquid state present in the tank 8.

Since the features not described of the second embodiment are identical to those of the first embodiment, reference will therefore be made to the description of FIG. 1 for the description of the elements common to both embodiments.

Figure 3:
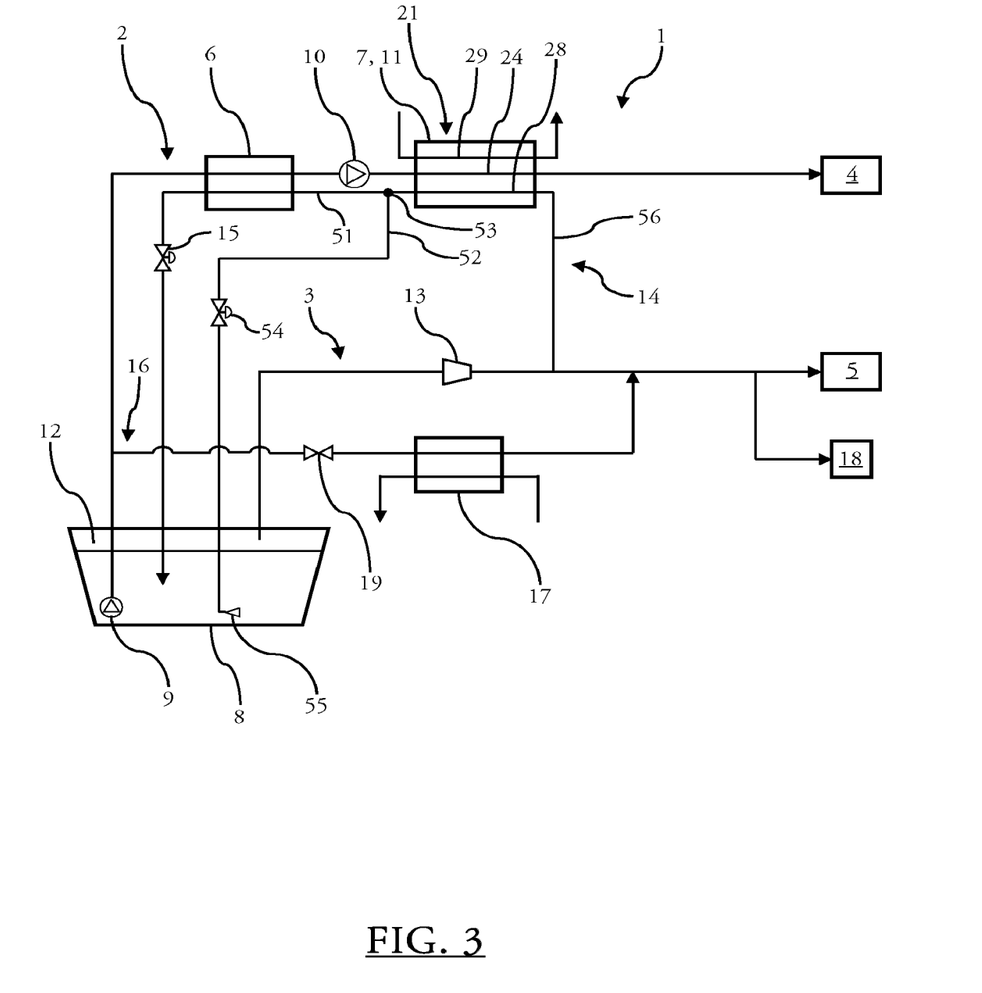
FIG. 3 is a schematic representation of a supply system according to an alternative to the second embodiment of the invention.

FIG. 3 shows an alternative to the second embodiment to the supply system 1 identical at every point to what is described in FIG. 2, with the exception of the following elements.

According to such alternative, the second heat exchanger 7 and the high-pressure evaporator 11 form a single heat exchanger 21. The solution shown in FIG. 3 makes it possible to design and manufacture the single heat exchanger 21 combining the second heat exchanger 7 and the high-pressure evaporator 11, these two components being subjected to the same high-pressure which dictates the technology used for the manufacture of this common heat exchanger. Such a solution can also be justified by a lack of space that does not allow the second heat exchanger 7 and the high-pressure evaporator 11 to be different from one another.

According to this alternative to the second embodiment, the divergence point 53 is arranged downstream of the single heat exchanger 21. It is therefore the main section 56 of the return line 14 which passes through the single heat exchanger 21. As such, the single heat exchanger 21 therefore comprises a first pass 24 within which the gas in the liquid state circulates from the first supply circuit 2, a second pass 28 within which the gas in the vapor state circulates from the return line 14 and a third pass 29 within which the heat transfer fluid circulates evaporating the gas in the liquid state circulating in the first pass 24.

At the first supply circuit 2, the gas in the liquid state at the inlet of the single heat exchanger 21 has previously passed through the first heat exchanger 6 and has been pumped by the additional pump 10, which therefore increased its temperature and pressure. It is thus possible that following the exchange of calories occurring at the single heat exchanger 21, the gas circulating in the first pass 24 leaves the single heat exchanger 21 in a liquid, vapor, two-phase or supercritical state.

Since the features not described of the alternative to the second embodiment are identical to those of the first and second embodiments, reference will therefore be made to the description of FIGS. 1 and 2 for the description of the elements common to said embodiments.

Figure 4:
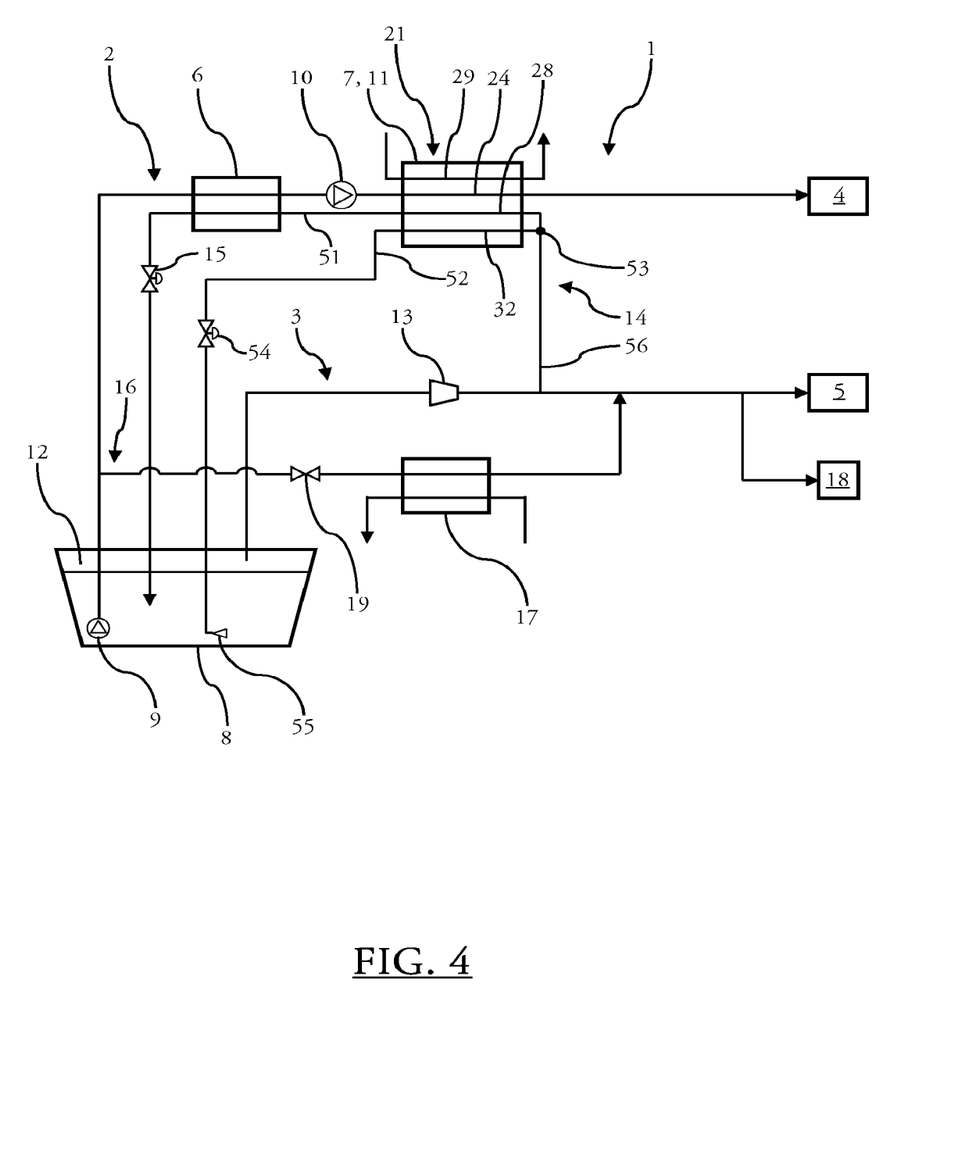
FIG. 4 is a schematic representation of a supply system according to a third embodiment of the invention.

FIG. 4 schematically represents a third embodiment of the supply system 1. As for the alternative to the second embodiment, the second heat exchanger 7 and the high-pressure evaporator 11 are combined to form the single heat exchanger 21, but this third embodiment is also applicable in the event of distinction between the second heat exchanger 7 and the high-pressure evaporator 11, as shown in FIG. 2. The third embodiment differs from the alternative to the second embodiment by the fact that the divergence point 53 is arranged upstream of the single heat exchanger 21. Thus, it is not the main section 56 that passes through the single heat exchanger 21, but the first section 51 and the second section 52 which both pass through the single heat exchanger 21.

The single heat exchanger 21 therefore here comprises the first pass 24 in which the gas in the liquid state circulates from the first supply circuit 2, the second pass 28 in which the gas in the vapor state optionally circulates from the first section 51 of the return line 14, the third pass 29 in which the heat transfer fluid circulates evaporating the gas in the liquid state circulating in the first pass 24, and a fourth pass 32 in which the gas in the vapor state of the second section 52 of the return line 14 optionally circulates. The third embodiment of the supply system 1 thus differs from the alternative to the second embodiment by the fact that the single heat exchanger 21 comprises four passes instead of three.

At the outlet of the single heat exchanger 21, the first section 51 extends to the tank 8 by passing through the first heat exchanger 6 while the second section 52 extends to the tank 8 by bypassing the first heat exchanger 6.

Figure 5:
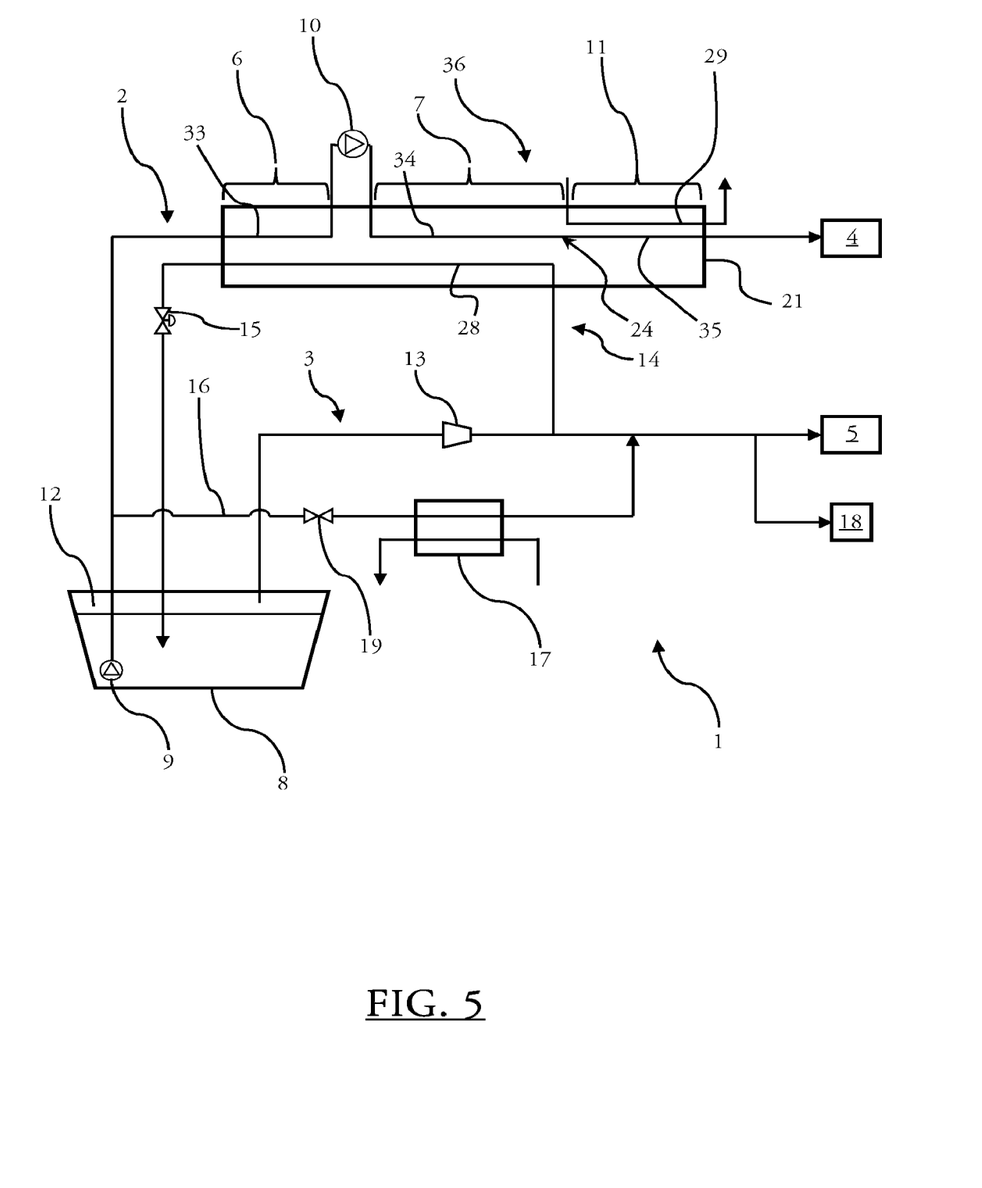
FIG. 5 is a schematic representation of a supply system solving the technical problem that underlies the invention.

FIG. 5 shows a supply system 1 in every point identical to the description given above with reference to FIG. 1, with the exception of the following elements.

The first heat exchanger 6, the second heat exchanger 7 and the high-pressure evaporator 11 form a single heat exchanger 32. Such a component thus comprises at least three passes, the first pass 24 by the gas collected in the liquid state in the tank 8 and circulating in the first supply circuit 2, the second pass 28 by the gas circulating in the return line 14 and the third pass 29 by the heat transfer fluid responsible for heating the gas collected in the liquid state in the tank 8 in order to evaporate it and deliver it to the high-pressure gas consuming apparatus 4.

It should be noted that this single heat exchanger 36, which is similar to the first heat exchanger 6, the second heat exchanger 7 and the high-pressure evaporator 11, comprises a first pass 24 separated into three distinct portions; a first portion 33 intended for heat exchange with the second pass 28, a second portion 34 intended for heat exchange with the second pass 28 and a third portion 35 intended for heat exchange with the third pass 29. The first portion 33 is separated from the second portion 34 by the presence of the additional pump 10, which is arranged outside the single heat exchanger 36. The additional pump 10 comprises an intake port connected to an outlet of the first portion 33, as well as a discharge port connected to an inlet of the second portion 34.

The solution shown in FIG. 5 makes it possible to design and manufacture a single heat exchanger 36 combining the first heat exchanger 6, the second heat exchanger 7 and the high-pressure evaporator 11, the technology of this single heat exchanger 36 then being imposed by the first pass 24 subjected to the high-pressure.

Figure 6:
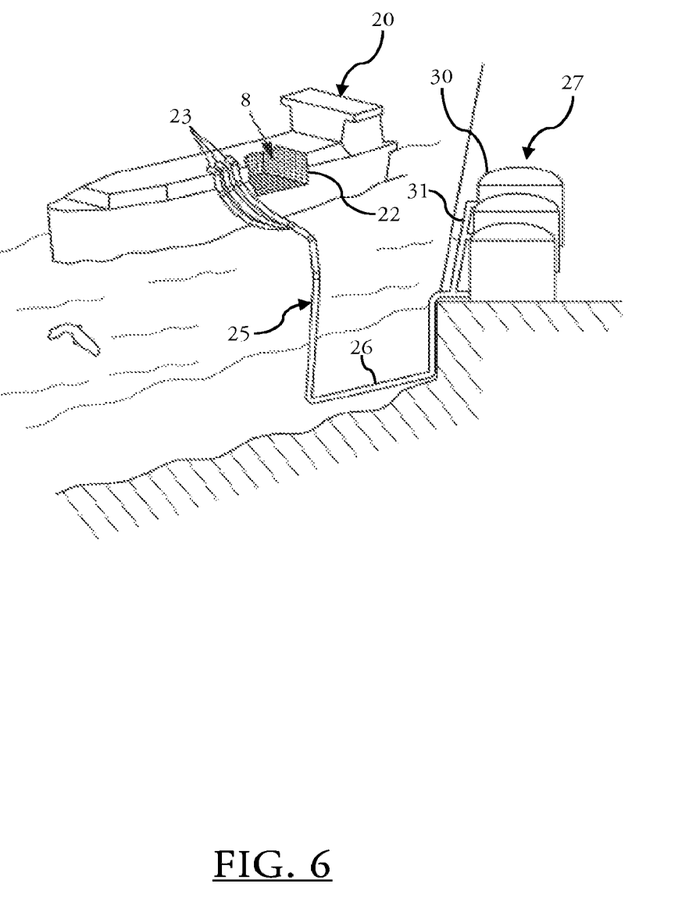
FIG. 6 is a cut-away schematic representation of a tank of a floating structure and of a terminal for loading and/or unloading this tank.

FIG. 6 is a cutaway view of a floating structure 20 showing the tank 8 that contains the gas in the liquid state and in the vapor state, this tank 8 having a generally prismatic shape mounted in a double hull 22 of the floating structure 20. The wall of the tank 8 comprises a primary sealing membrane intended to be in contact with the gas in the liquid state contained in the tank 8, a secondary sealing membrane arranged between the primary sealing membrane and the double hull 22 of the floating structure 20, and two thermally insulating barriers respectively arranged between the primary sealing membrane and the secondary sealing membrane and between the secondary sealing membrane and the double hull 22.

Loading and/or unloading pipes 23 for gas in the liquid state, arranged on the upper deck of the floating structure 20, can be connected, by means of suitable connectors, to a marine or port terminal to transfer the cargo of gas in the liquid state from or to the tank 8.

FIG. 6 also shows an example of a maritime or port terminal comprising loading and/or unloading equipment 25, an underwater pipeline 26 and an onshore and/or port facility 27. The onshore and/or port facility 27 can for example be arranged on the dock of a port, or according to another example be arranged on a concrete gravity platform. The onshore and/or port facility 27 comprises storage tanks 30 for gas in the liquid state, and connecting pipes 31 that are connected by the underwater pipe 26 to the loading and unloading equipment 25.

To generate the pressure necessary for the transfer of the gas in the liquid state, pumps equipping the onshore and/or port facility 27 and/or pumps equipping the floating structure 20 are implemented.

Of course, the invention is not limited to the examples that have just been described, and numerous modifications can be made to these examples without departing from the scope of the invention.

The invention, as has just been described, clearly achieves the goal that it was set, and makes it possible to propose a gas supply system for apparatuses consuming gas at high or low-pressure, the high-pressure of which is done using pumps and evaporator, and comprising a means for condensing a gas in the vapor state before it is returned to the tank. Variants not described here could be implemented without departing from the context of the invention, since, in accordance with the invention, they comprise a gas supply system according to the invention.

The invention claimed is:

1. A system for supplying gas to at least one high-pressure gas consuming apparatus and at least one low-pressure gas consuming apparatus of a floating structure comprising at least one tank configured to contain the gas, the supply system comprising:
   at least a first gas supply circuit of the high-pressure gas consuming apparatus, comprising at least one pump configured to pump the gas collected in the liquid state into the tank,
   at least one high-pressure evaporator configured to evaporate the gas circulating in the first gas supply circuit,
   at least one second circuit supplying gas to the low-pressure gas-consuming apparatus, comprising at least one compressor configured to compress gas taken in the vapor state from the tank to a pressure compatible with the requirements of the low-pressure gas-consuming apparatus, and
   a gas return line connected to the second supply circuit downstream of the compressor and extending to the tank, the supply system comprising at least a first heat exchanger and at least a second heat exchanger each configured to exchange heat between the gas circulating in the return line in the vapor state and the gas in the liquid state circulating in the first supply circuit, the first supply circuit comprising an additional pump interposed between the first heat exchanger and the second heat exchanger.

2. The supply system according to claim 1, wherein the return line comprises a divergence point dividing the return line into a first section and a second section both extending from the divergence point to the tank, the first heat exchanger being configured to exchange heat between the gas circulating in vapor state in the first section of the return line and the liquid-state gas circulating in the first supply circuit, the second section bypassing the first heat exchanger.

3. The supply system according to claim 2, wherein the divergence point is arranged on the return line between the first heat exchanger and the second heat exchanger.

4. The supply system according to claim 2, wherein the divergence point is arranged on the return line, between the connection to the second supply circuit and the second heat exchanger, the first section and the second section passing through the second heat exchanger.

5. The supply system according to claim 2, wherein the second section of the return line comprises one end submerged in the liquid contained in the tank, the second section comprising an ejection member arranged at the submerged end.

6. The supply system according to claim 2, wherein the second section of the return line comprises a flow control member.

7. The supply system according to claim 1, wherein the first heat exchanger is configured to condense the gas circulating in the return line.

8. The supply system according to claim 1, wherein the second heat exchanger is configured to pre-cool the gas circulating in the return line.

9. The supply system according to claim 1, wherein the return line comprises an expansion member arranged downstream of the first heat exchanger.

10. The supply system according to claim 1, comprising an auxiliary supply line connected to the first supply circuit, upstream of the first heat exchanger, and extending to the second supply circuit, downstream of the compressor, the supply system comprising a low-pressure evaporator configured to evaporate the gas circulating in the auxiliary supply line.

11. The supply system according to claim 1, wherein the pump is configured to raise a pressure of the gas in the liquid state to a value of between 6 and 17 bar and the additional pump is configured to raise the pressure of the gas in the liquid state to a value of between 30 and 400 bar.

12. The supply system according to claim 1, wherein the compressor is configured to raise a pressure of the gas to a value of between 6 and 20 bar absolute.

13. The supply system according to claim 1, wherein the high-pressure evaporator is arranged downstream of the second heat exchanger on the first gas supply circuit of the high-pressure gas consuming apparatus.

14. The supply system according to claim 1, wherein the second heat exchanger and the high-pressure evaporator form a single heat exchanger.

15. A floating structure for storing and/or transporting gas in the liquid state, comprising at least one tank for gas in the liquid state, at least one high-pressure gas consuming apparatus, at least one low-pressure gas consuming apparatus and at least one system for supplying gas to these apparatuses according to claim 1.

16. A system for loading or unloading a liquid gas which combines at least one on-shore and/or port facility and at least one floating structure for storing and/or transporting liquid gas according to claim 15.

17. A method for loading or unloading a liquid gas from a floating structure for storing and/or transporting gas according to claim 15, wherein pipes for loading and/or unloading gas in the liquid state arranged on an upper deck of the floating structure can be connected, by means of appropriate connectors, to a maritime or port terminal in order to transfer the gas in the liquid state to or from the tank.

* * * * *